United States Patent
Nagano et al.

(10) Patent No.: US 7,387,506 B2
(45) Date of Patent: Jun. 17, 2008

(54) MOLD APPARATUS

(75) Inventors: Hiroshi Nagano, Aichi (JP); Yasuharu Imaizumi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/717,192

(22) Filed: Mar. 13, 2007

(65) Prior Publication Data

US 2007/0218161 A1   Sep. 20, 2007

(30) Foreign Application Priority Data

Mar. 14, 2006   (JP) .............................. 2006-069166

(51) Int. Cl.
*B29C 45/64* (2006.01)
(52) U.S. Cl. ............... 425/190; 425/451.9; 425/595; 425/589; 425/450.1; 425/575
(58) Field of Classification Search ............ 425/451.9, 425/595, 589, 450.1, 575, 576, 190; 100/258 A
See application file for complete search history.

(56) References Cited

U.S. PATENT DOCUMENTS 2,587,070 A * 2/1952 Spillman ................ 249/110
5,114,329 A * 5/1992 Nakamura et al. .......... 425/190
5,249,951 A * 10/1993 Leonhartsberger et al. . 425/589
5,314,327 A * 5/1994 Stein ........................... 425/589
5,456,588 A * 10/1995 Yonekubo et al. .......... 425/183
5,556,656 A * 9/1996 Lampl et al. ............... 425/589

FOREIGN PATENT DOCUMENTS

JP        7-15318 U       3/1995

* cited by examiner

*Primary Examiner*—Steven P. Griffin
*Assistant Examiner*—Seyed Masoud Malekzadeh
(74) *Attorney, Agent, or Firm*—Morgan, Lewis & Bockius LLP

(57) ABSTRACT

In a mold apparatus, guide pins are provided at a movable mold, and guide holes are formed in a fixed mold, and even when the guide pins are offset in an arbitrary direction perpendicular to a mold clamping direction, the guide holes can be fitted respectively to the guide pins, and can guide the movable mold 19A into a position where the movable mold coincides with the fixed mold. A holding device is provided at the movable mold, and this holding device holds the movable mold relative to a movable base in a manner to allow the movable mold to move in an arbitrary direction perpendicular to the mold clamping direction.

3 Claims, 10 Drawing Sheets

MOLD APPARATUS

BACKGROUND OF THE INVENTION

This invention relates to a mold apparatus used in a molding machine such as a rotary injection molding machine and a slide-type injection molding machine.

As a conventional single molding machine for molding a multi-color or a multi-material molded product, there is known, for example, a rotary injection molding machine (see, for example, JP-UM-A-7-15318 Publication). This conventional rotary injection molding machine 1 is constructed as shown in FIGS. 1 to 10. A plurality of fixed molds 3A and 3B are mounted on a fixed platen 2, and are disposed at equal intervals around a rotation axis (center) Ca described later. A movable base 4a is rotatably mounted on a movable platen 4. A plurality of movable molds 5A and 5B are mounted on the movable base 4a through a base 6, and are disposed symmetrically with respect to the rotation axis Ca.

For molding a molded product, one movable mold 5A and one fixed mold 3A are clamped or closed together, and a first-stage molded product is molded. Thereafter, the one movable mold 3A is opened (as shown in FIG. 8), and the movable base 4a is rotated about the rotation axis Ca through an angle of 180 degrees, and by doing so, the one movable mold 5A is rotated or angularly moved (as indicated by arrow A in FIG. 9) to a position where it is opposed to the other fixed mold 3B (while the other movable mold 5B is opposed to the one fixed mold 3A. Then, the movable platen 4 is moved in a mold clamping direction to be clamped to the other fixed mold 3B. At this time, the other movable mold 5B is clamped to the one fixed mold 3A.

In such rotary injection molding machine 1, when the movable molds 5A and 5B were rotated, a mold center Pa (see FIG. 10) of each movable mold 5A, 5B was sometimes slightly (about 0.1 to about 0.2 mm) out of alignment with (or was offset from) a mold center Pb of the corresponding fixed mold 3A, 3B, depending on manufacturing accuracies of the molds and an assembling accuracy of the molding machine or the accuracy of mounting, of the movable molds 5A and 5B on the movable base 4a and a mounting accuracy of the fixed molds 3A and 3B. Therefore, in some cases, the fixed molds 3A and 3B and the movable molds 5A and 5B could not be clamped together, or even if this mold clamping operation could be achieved, the molds were damaged, or the mating molds were brought into biting engagement with each other. These problems were encountered also with slide-type injection molding machines.

SUMMARY OF THE INVENTION

This invention has been made in view of the above circumstances, and an object of the invention is to provide a mold apparatus in which even when a mold center of a movable mold is disposed out of alignment with a mold center of a fixed mold, this misalignment can be corrected during a mold clamping operation so as to achieve the proper mold clamping.

According the present invention, a mold apparatus includes:

fixed modes adapted to be mounted on a fixed platen of a molding machine;

movable molds that are mounted on a movable base which can be moved in a mold clamping direction in the molding machine and are rotatable or slidable in a plane perpendicular to the mold clamping direction, wherein the movable molds are moved into a mold clamping position where the movable molds are to be clamped respectively to the fixed molds by rotation or sliding movement of the movable base, and the movable base is moved in the mold clamping direction, thereby claming the movable molds to the fixed molds, respectively, wherein the movable mold includes a mold clamping guided portion, wherein the fixed mold includes a mold clamping guiding portion, and when the mold clamping guided portion is offset with respect to the mold clamping guiding portion in an arbitrary direction perpendicular to the mold clamping direction, the mold clamping guiding portion can be fitted to the mold clamping guided portion, and can guide the movable mold into a position where the movable mold coincides with the fixed mold, and wherein the movable mold includes a holding unit that holds the movable mold relative to the movable base so as to allow the movable mold to move in an arbitrary direction perpendicular to the mold clamping direction.

In the present invention, even when a mold center of the movable mold is disposed out of alignment with a mold center of the corresponding fixed mold during the movement of the movable mold in the direction toward the fixed mold (that is, in the mold clamping direction) for mold clamping purposes, the mold clamping guide portion can be fitted to the mold clamping guiding portion. And besides, the movable mold is held by the holding device so as to be moved in an arbitrary direction perpendicular to the mold clamping direction. Therefore, when the movable mold is merely moved in the mold clamping direction, the mold clamping guided portion is fitted to the mold clamping guiding portion, and by the mold clamping guided portion and the mold clamping guiding portion, the movable mold can be brought into the position where said movable mold coincides with the fixed mold. Thus, even when the mold center of the movable mold is disposed out of alignment with the mold center of the fixed mold, this misalignment can be corrected during the mold clamping operation so as to achieve the proper mold clamping.

DETAILED DESCRIPTION OF PREFERRED EMBODIMENTS

Figure 2:
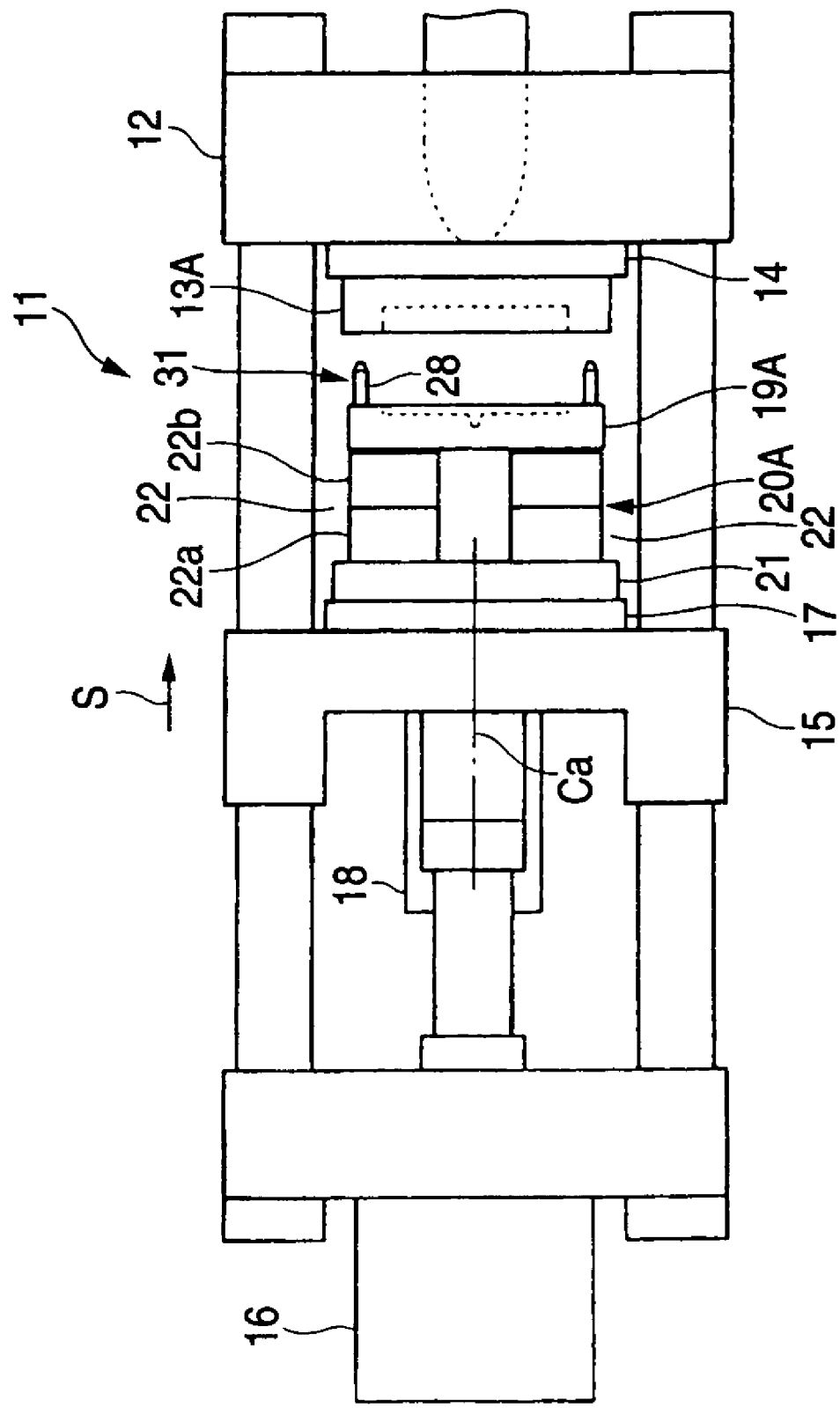
FIG. 2 is a side-elevational view of a rotary injection molding machine.
Figure 3:
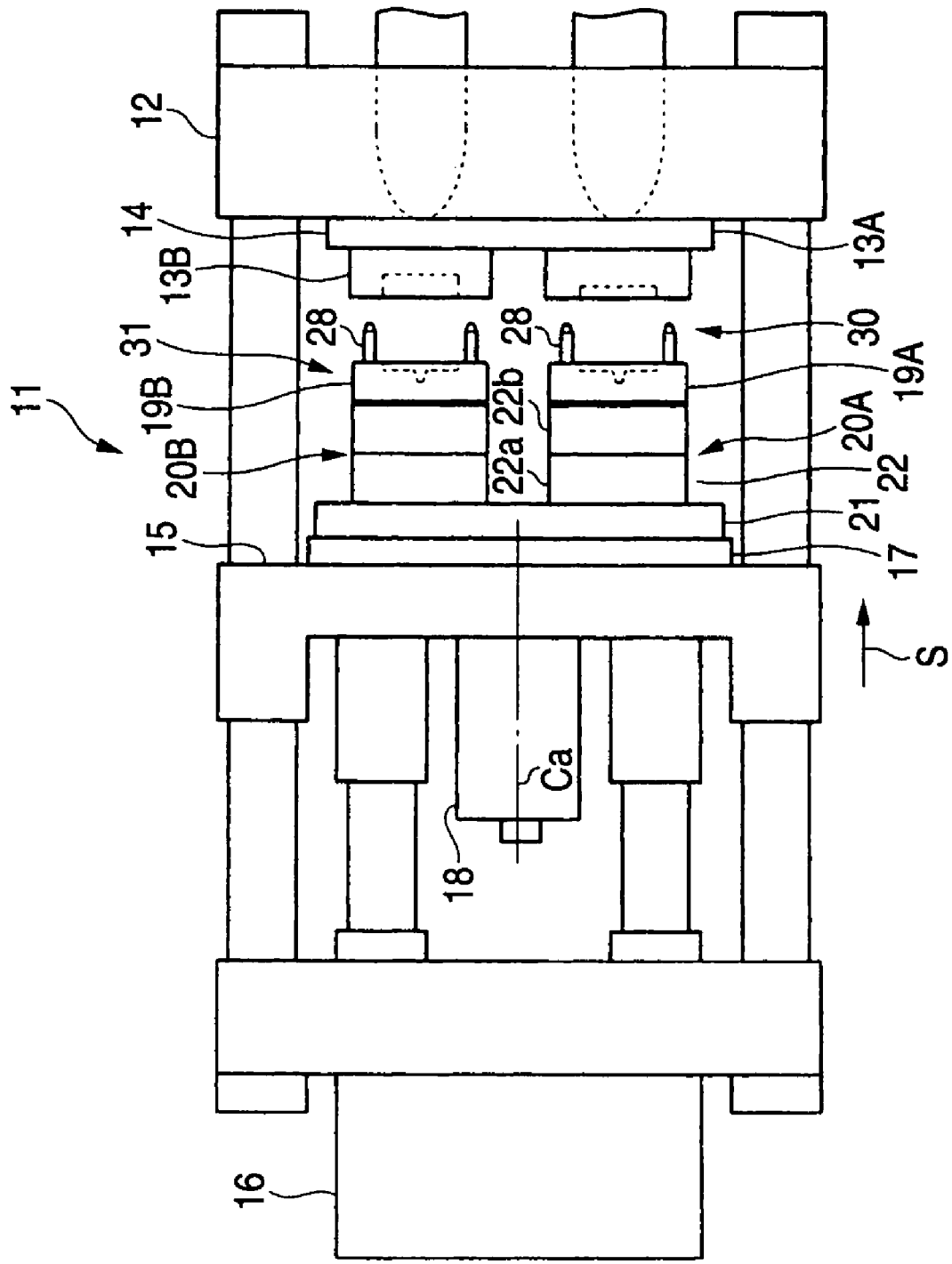
FIG. 3 is a plan view of the rotary injection molding machine.
Figure 4:
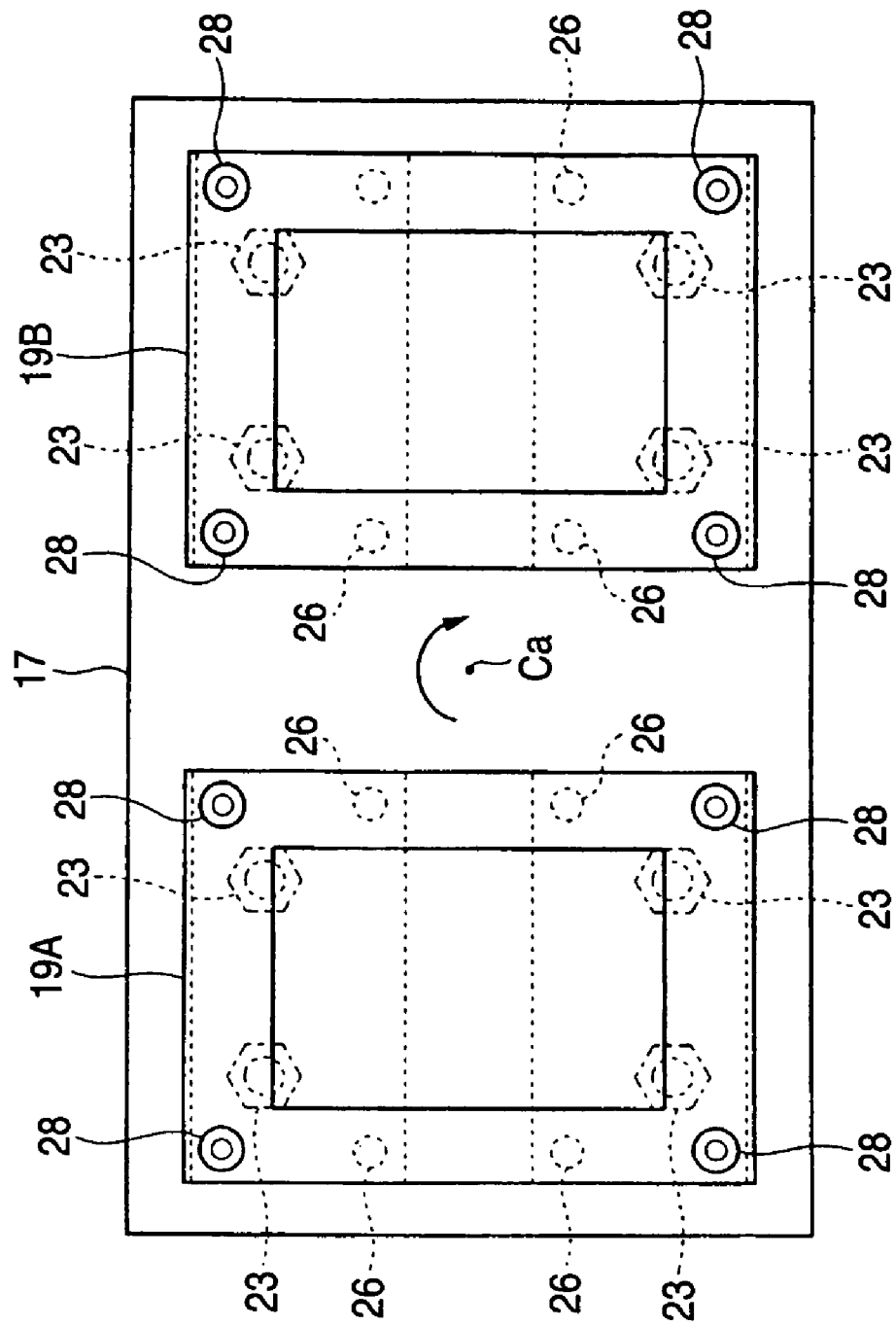
FIG. 4 is a front-elevational view showing movable molds mounted on a base.

One preferred embodiment of the present invention applied, for example, to a mold apparatus of a rotary injection molding machine will now be described with reference to FIGS. 1 to 7. FIG. 2 is a side-elevational view of the rotary injection molding machine 11, and FIG. 3 is a plan view thereof. In FIGS. 2 and 3, a plurality of fixed molds 13A and 13B are mounted on a fixed platen 12 through a base 14, and are disposed at equal intervals around an axis (center) Ca of rotation of a movable base 17 described later. A movable platen 15 can be moved in a mold clamping direction (that is, a direction of arrow S) and its opposite direction by a mold clamping device 16. The movable base 17 is mounted on the movable platen 15 so as to be rotated (or angularly moved) about the rotation axis Ca in a direction of arrow A (see FIG. 4) and its opposite direction. This movable base 17 can be driven to be rotated by a rotation device 18.

As shown in FIG. 3, a plurality of movable molds 19A and 19B are mounted on the movable base 17 through respective holding devices (holding unit) 20A and 20B and a common base 21. Each of the holding devices 20A and 20B holds the movable mold 19A, 19B relative to the movable base 17 in a manner to allow this movable mold to move in an arbitrary direction perpendicular to the mold clamping direction. More specifically, the holding devices are constructed as follows. Since the holding devices 20A and 20B have the same construction, one holding device 20A will be described below.

Figure 1:
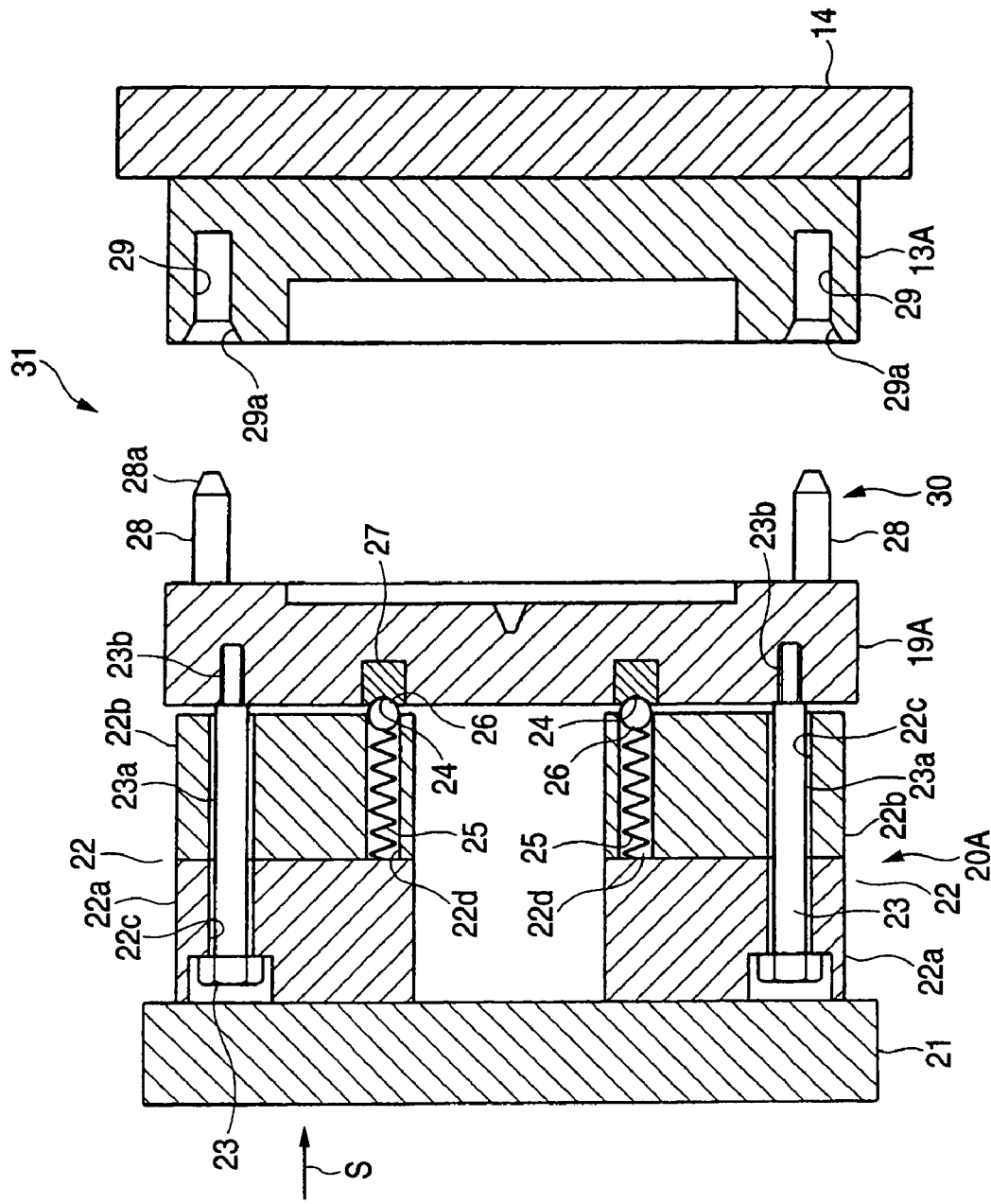
FIG. 1 is a vertical cross-sectional side view showing one preferred embodiment of a mold apparatus of the present invention.

As shown in FIG. 1, the holding device 20A comprises a pair of mounting members 22 mounted on the base 21 of the movable base 17, bolts (interconnecting members) 23 connecting the movable mold 19A to the mounting members 22 in a manner to allow the movable mold 19A to move in an arbitrary direction perpendicular to the mold clamping direction and also in the mold clamping direction, positioning recess portions 24 provided at the movable mold 19A, and pressing members 26 which are mounted on the mounting members 22, and are urged respectively toward the positioning recess portions 24 by respective spring members 25.

Each of the mounting members 22 comprises a first spacer 22a, and a second spacer 22b. Bolt bodies 23a of the bolts 23 are loosely fitted respectively in bolt passage holes 22c formed in the first and second spacers 22a and 22b. As a result, each of the bolts 23 can be moved in an arbitrary direction perpendicular to the mold clamping direction (the direction of arrow S), that is, in an arbitrary radial direction (any direction throughout 360 degrees), and also can be moved slightly in the mold clamping direction and its opposite direction.

Screw portions 23b of the bolts 23 project from the corresponding second spaces 22b, and the movable mold 19A is fixed by screw fastening to the screw portions 23b.

Pressing member-receiving holes 22d are formed in each second spacer 22b, and the spring members 25 each comprising, for example, a compression coil spring, are received in the pressing member-receiving holes 22d, respectively. Each pressing member 26 is disposed in an open end portion of the corresponding pressing member-receiving hole 22d in such a manner that the pressing member 26 receives a spring force of the spring member 25. The pressing member 26 comprises a spherical member, and part of this pressing member 26 projects from the pressing member-receiving hole 22d toward the movable mold 19A.

The positioning recess portions 24 are formed respectively in reception members 27 embedded in the movable mold 19A, and each positioning recess portion 24 has a generally conical recess-shape. Each pressing member 26 receives the spring force of the corresponding spring member 25, and therefore is urged in the direction of arrow S to be pressed against the positioning recess portion 24. By these pressing forces, the movable mold 19A is provisionally positioned relative to the mounting members 22 and hence to the movable base 17, and also the movable mold 19A is held in spaced relation to the second spacer 22b. Each pressing member 26 can move out of the positioning recess portion 24 in an arbitrary direction (any direction throughout 360 degrees) perpendicular to the direction of arrow S. Guide pins 28 (serving as mold clamping guided portions) are formed on and project from each of the movable molds 19A and 19B. A tapered portion 28a is formed at distal end of each of the guide pins 28.

Guide holes 29 (serving as mold clamping guiding portions) are formed respectively in those portions of the fixed molds 13A and 13B opposed respectively to the guide pins 28. The guide holes 29 are generally equal in diameter to the guide pins 28, and an enlarged opening portion 29a of a conical tapering shape is formed at an open end portion of each guide hole 29, and spreads toward the open end thereof. Each guide pin 28 has the tapered portion 28a, and also each guide hole 29 has the enlarged opening portion 29a, and therefore even when each guide pin 28 is offset relative to the corresponding guide hole 29 in an arbitrary direction perpendicular to the mold clamping direction, the guide pin 28 can be fitted into the guide hole 29, and also the guide pins 28 can guide the movable mold 19A, 19B into a coinciding position (mold center coinciding position) where the movable mold coincides with the fixed mold 13A, 13B. A maximum amount of offset of the guide pin 28 and the guide hole 29 relative to each other which allows the guide pin 28 to fit into the guide hole 29 is set to a value larger than a maximum amount (usually, 0.2 mm or less) of offset of the mold centers of the movable mold 19A, 19B and fixed mold 13A, 13B relative to each other after the rotation of the movable base 17. The guide pins 28 and the guide holes 29 jointly form a guide unit 30.

The mold apparatus 31 comprises the fixed molds 13A and 13B, the movable molds 19A and 19B, the holding devices 20A and 20B, and the guide unit 30.

Figure 5:
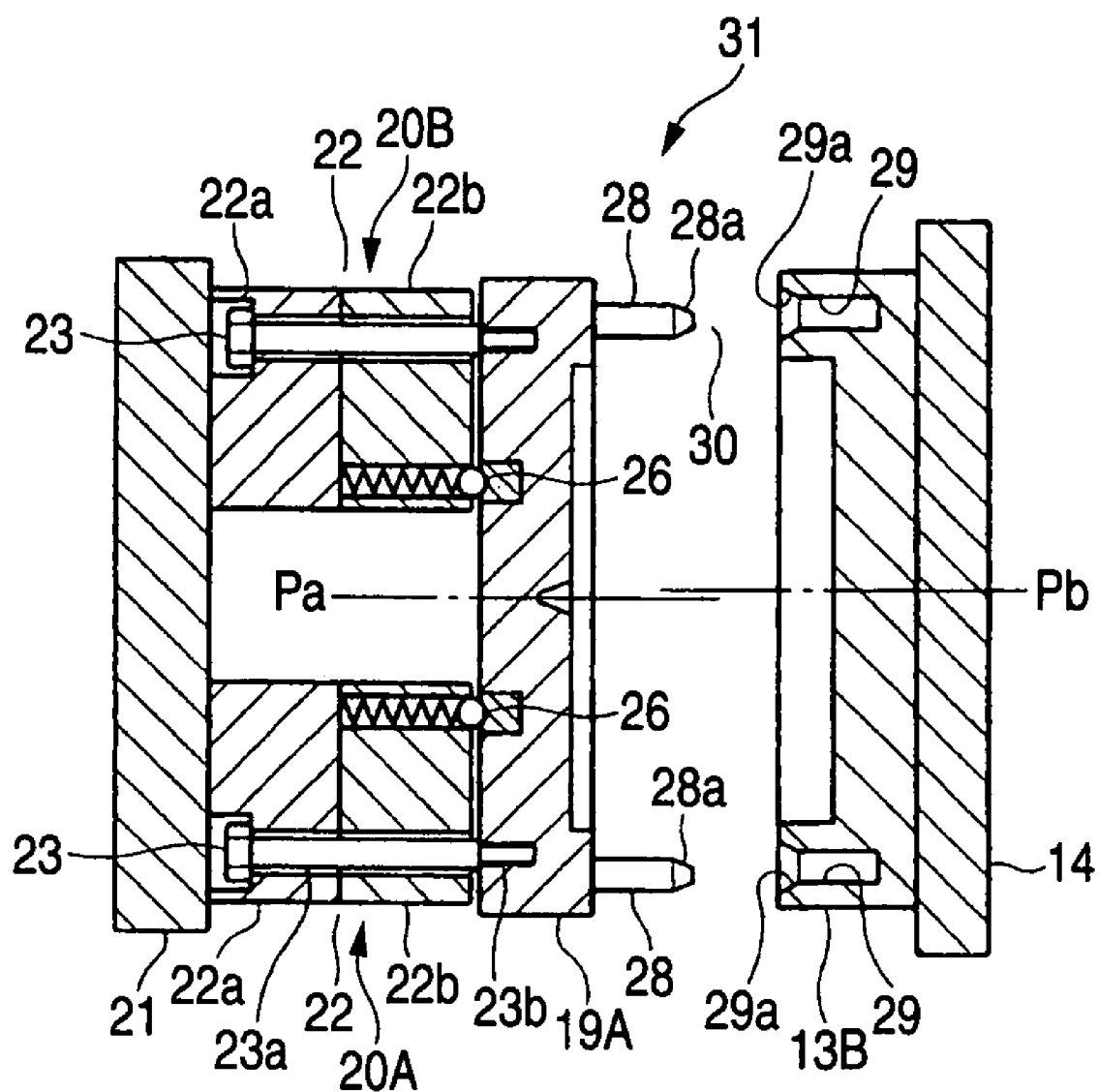
FIG. 5 is a vertical cross-sectional side view of the mold apparatus showing a condition before a mold clamping operation is effected.
Figure 6:
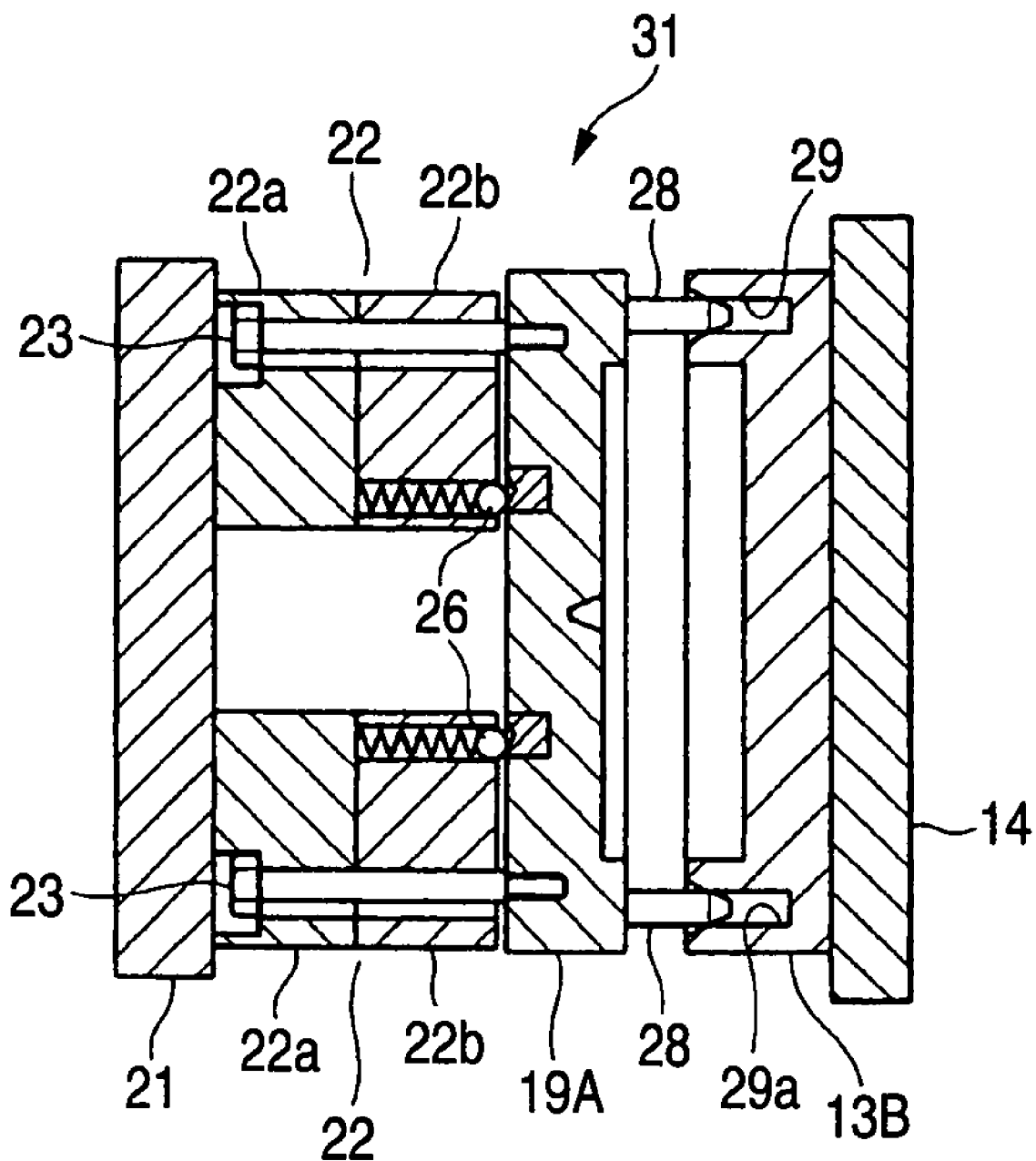
FIG. 6 is a vertical cross-sectional side view of the mold apparatus showing a condition in the process of the mold clamping operation.

In this embodiment of the above construction, when a molded product is to be molded, one movable mold 19A and one fixed mold 13A are clamped together, and a first-stage molded product is molded. Thereafter, the one movable mold 19A is opened (as shown in FIG. 3), and the movable base 17 is rotated about the rotation axis Ca through an angle of 180 degrees, and by doing so, the one movable mold 19A is rotated or angularly moved (as indicated by arrow A in FIG. 4) to a position where it is opposed to the other fixed mold 13B (while the other movable mold 19B is opposed to the one fixed mold 13A. This opposed condition is shown in FIG. 5.

Figure 7:
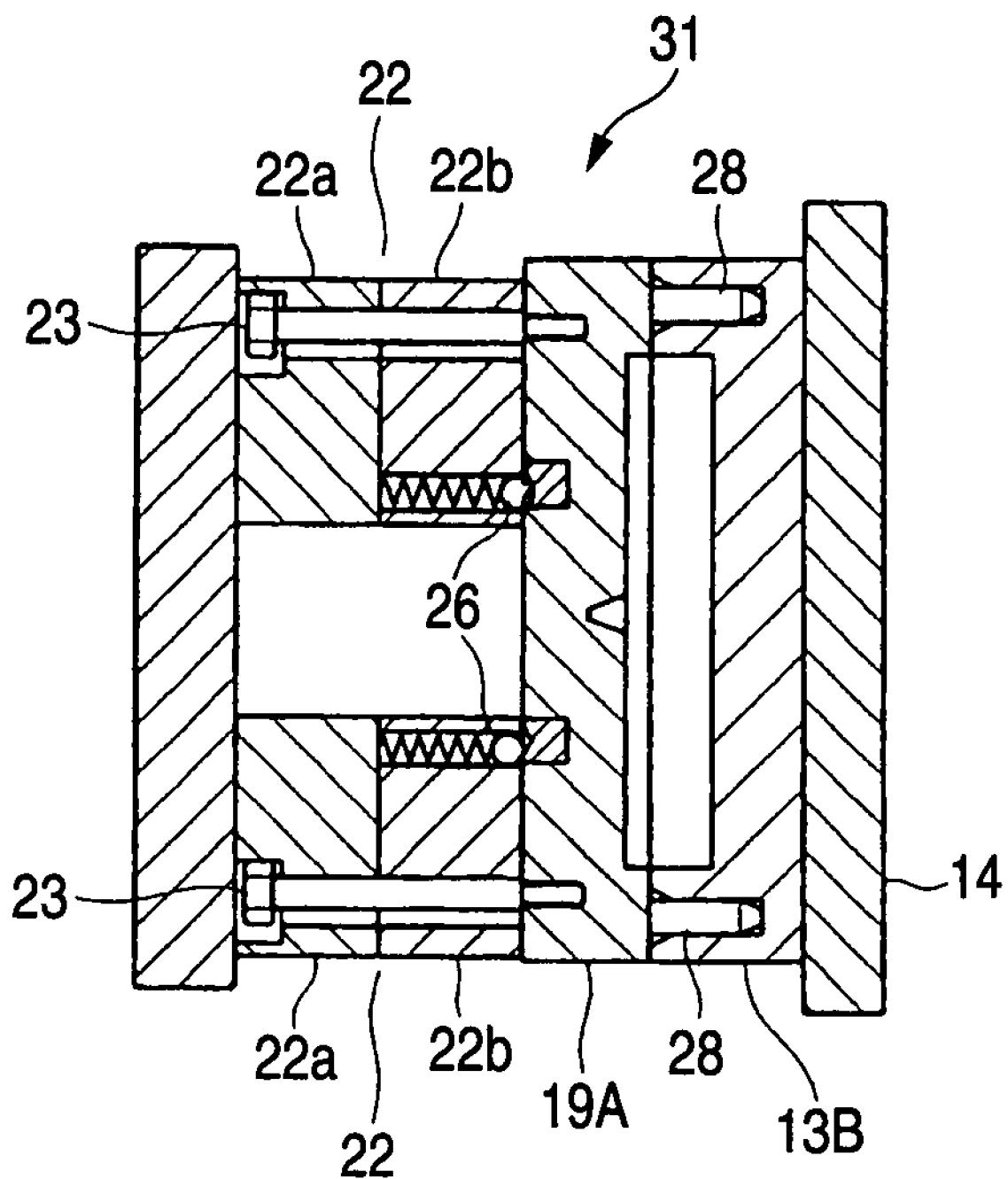
FIG. 7 is a vertical cross-sectional side view of the mold apparatus showing a condition after the mold clamping operation is finished.
Figure 8:
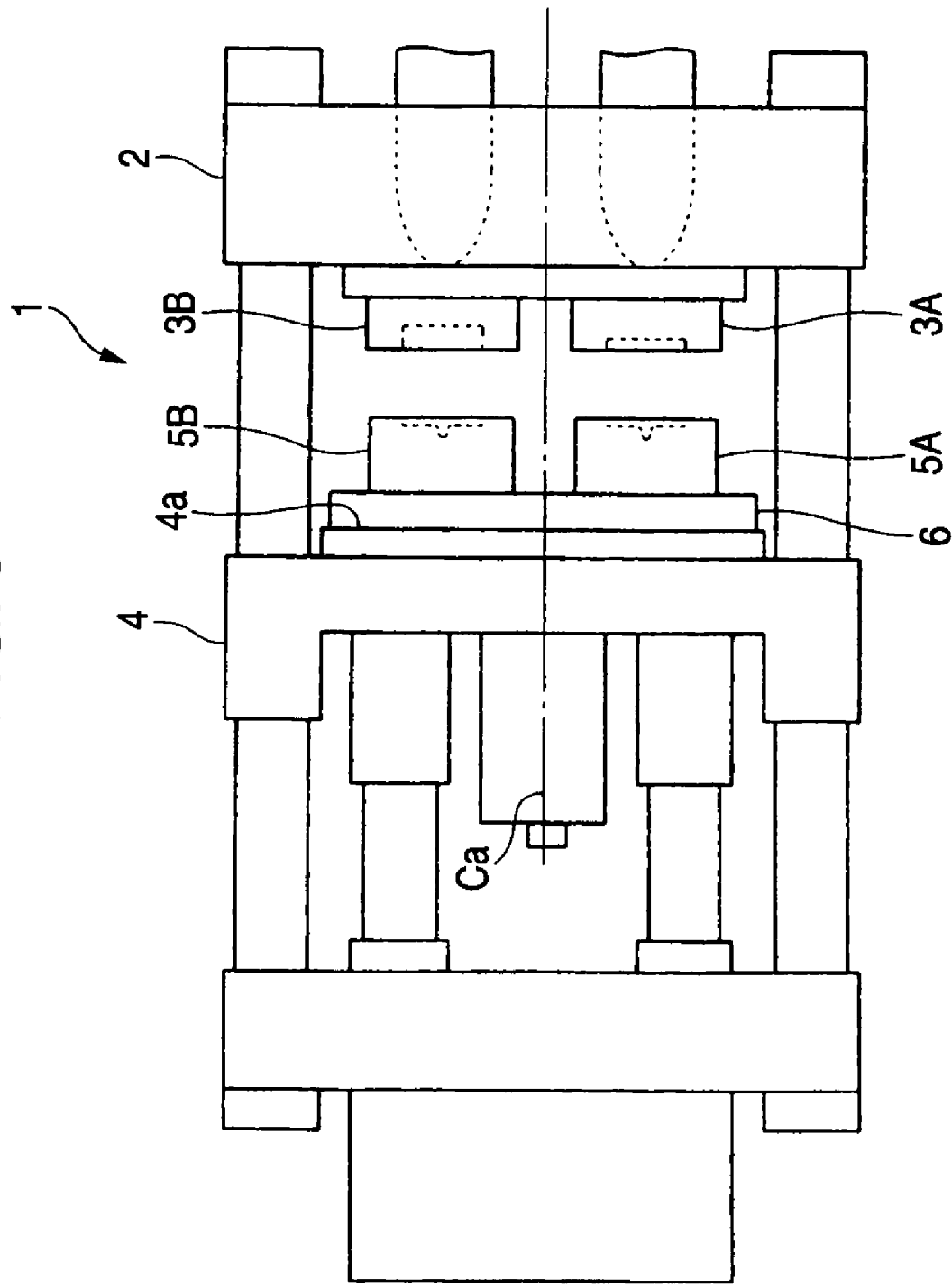
FIG. 8 is a view similar to FIG. 3, but showing a conventional example.
Figure 9:
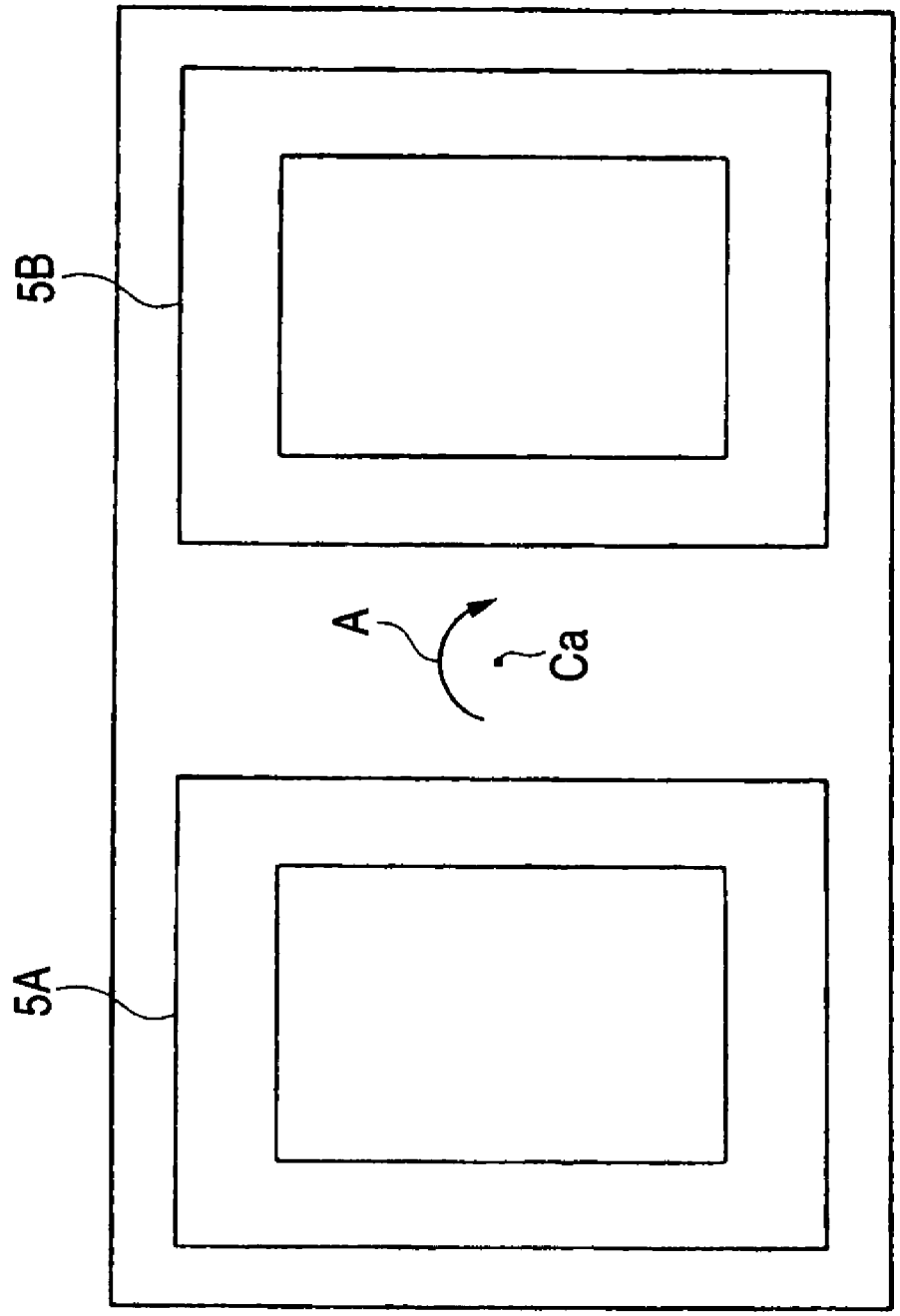
FIG. 9 is a view similar to FIG. 4, but showing the conventional example.
Figure 10:
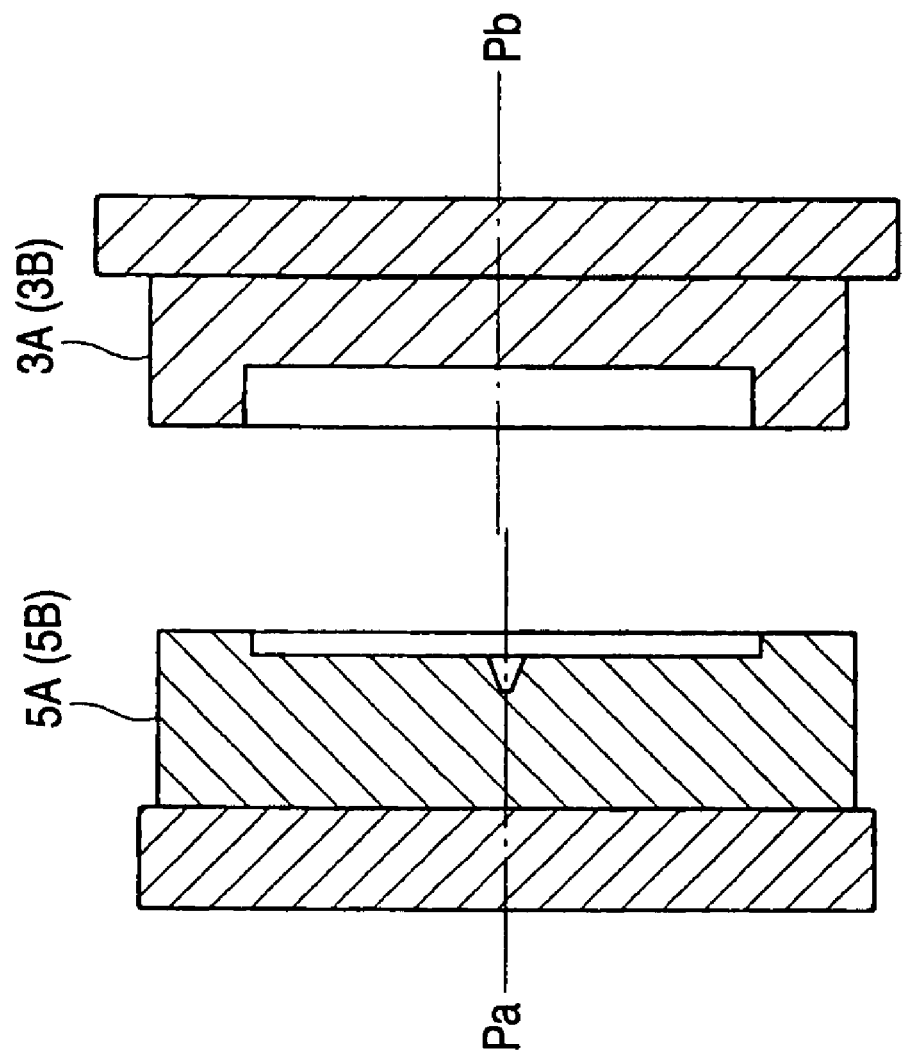
FIG. 10 is a view similar to FIG. 1, but showing the conventional example.

Here, let's assume that the mold center Pa of the movable mold 19A is not disposed in alignment with (or is offset from) the mold center Pb of the fixed mold 13B. Although this offset amount is, at the most, about 2 mm, it is shown as a larger offset amount in FIG. 5 for better understanding. In the condition of FIG. 5, when the movable platen 15 is moved in the mold clamping direction, the holding device 20A and the movable mold 19A are moved in the mold clamping direction, and the tapered portions 28a of the guide pins 28 are fitted respectively into the enlarged opening portions 29a of the guide holes 29, and each guide pin 28 receives a force acting in an arbitrary direction perpendicular to the mold clamping direction, and at this time the guide pins 28 are inserted into the respective guide holes 29 (see FIG. 6) while moving the movable mold 19A (The positioning recess portions 24 are moved relative to the respective pressing members 26 in the arbitrary direction perpendicular to the mold clamping direction) since the movable mold 19 can be moved in an arbitrary direction perpendicular to the mold clamping direction. As a result, the mold center of the movable mold 19A is brought into alignment with the mold center of the fixed mold 13B, so that the proper mold clamping operation is effected as shown in FIG. 7.

In this embodiment, even when the mold center of the movable mold 19A, 19B is disposed out of alignment with the mold center of the fixed mold 13A, 13B during the mold clamping of the movable molds 19A and 19B, the guide pins 28 can be fitted into the respective guide holes 29. And besides, the movable molds 19A and 19B are held by the respective holding devices 20A and 20B so as to be moved in an arbitrary direction perpendicular to the mold clamping direction. Therefore, when the movable molds 19A and 19B are merely moved in the mold clamping direction, the guide pins 28 are fitted into the respective guide holes 29, and by the guide pins 28 and the guide holes 29, each movable mold can be brought into the position where the movable mold coincides with the corresponding fixed mold. Thus, even when the mold center of the movable mold 19A, 19B is disposed out of alignment with the mold center of the fixed mold 13A, 13B, this misalignment can be corrected during the mold clamping operation so as to achieve the proper mold clamping.

Furthermore, in this embodiment, each of the holding devices 20A and 20B comprises the mounting members 22 fixed to the movable base 17, the bolts 23 connecting the movable mold 19A, 19B to the mounting members 22 in a manner to allow the movable mold to move in an arbitrary direction perpendicular to the mold clamping direction and also in the mold clamping direction, the positioning recess portions 24 formed at the movable mold 19A, 19B, and the pressing members 26 which are mounted on the mounting members 22, and are urged by the respective spring members 25, and are pressed to be fitted in the respective positioning recess portions 24, thereby provisionally positioning the movable mold 19A, 19B relative to the mounting members 22 and hence relative to the movable base 17, and hold the movable mold 19A, 19B in spaced relation to the mounting members 22, and can move out of the respective positioning recess portions 24 in the above arbitrary direction. With this construction, when the pressing members 26 are kept fitted in the respective positioning recess portions 24, the movable mold 19A, 19B can be provisionally fixed relative to the movable base 17 without shaking, and besides when the mold center of the movable mold is disposed out of alignment with the mold center of the corresponding fixed mold, the movable mold can be smoothly moved from the provisionally-fixed position in an arbitrary direction perpendicular to the mold clamping direction. Particularly, the movable mold 19A, 19B is held in spaced relation to the mounting members 22 by the pressing members 26 and the spring members 25, and therefore the movable mold 19A, 19B can be moved particularly smoothly.

In this embodiment, each of the pressing members 26 comprises the spherical member, and each of the positioning recess portion 24 is formed into the conical recess-shape, and therefore during the mold opening operation, the movable molds 19A and 19B can be smoothly moved to their respective provisionally-fixed positions, and besides the positional accuracies thereof can be enhanced.

The present invention is not limited to the above embodiment, and the following modifications can be made. Bolts 23 (serving as the interconnecting members) can be provided in a loosely-fitted condition at each movable mold 19A, 19B, in which case the second spacer 22b (serving as the mounting member) is fixedly connected to the movable mold by these bolts 23. Also, positioning recess portions 24 can be provided at the second spacer 22b, while pressing members 26 and spring members 25 can be provided at the movable mold 19A, 19B. The invention can be applied also to a slide-type injection molding machine. The number of the movable molds, as well as the number of the fixed molds, may be three or more.

What is claimed is:

1. A mold apparatus comprising:
   fixed molds adapted to be mounted on a fixed platen of a molding machine;
   movable molds that are mounted on a movable base which can be moved in a mold clamping direction in the molding machine and are one of rotatable and slidable in a plane perpendicular to the mold clamping direction,
   wherein the movable molds are moved into a mold clamping position where the movable molds are to be clamped respectively to the fixed molds by one of a rotation and sliding movement of the movable base, and the movable base is moved in the mold clamping direction, thereby clamping the movable molds to the fixed molds, respectively,
   wherein the movable mold includes a mold clamping guided portion,
   wherein the fixed mold includes a mold clamping guiding portion, and when the mold clamping guided portion is offset with respect to the mold clamping guiding portion in an arbitrary direction perpendicular to the mold clamping direction, the mold clamping guiding portion can be fitted to the mold clamping guided portion, and can guide the movable mold into a position where the movable mold coincides with the fixed mold, and
   wherein the movable mold includes a holding unit that holds the movable mold relative to the movable base so as to allow the movable mold to move in an arbitrary direction perpendicular to the mold clamping direction.

2. The mold apparatus according to claim 1, wherein the holding unit comprises:
   a mounting member fixed to the movable base;
   an interconnecting member which is provided at one of the mounting member and the movable mold, and connects the movable mold to the mounting member so as to allow the movable mold to move both in an arbitrary direction perpendicular to the mold clamping direction and in the mold clamping direction;
   a positioning recess portion provided at one of the mounting member and the movable mold; and
   a pressing member which is mounted at the other of the mounting member and the movable mold, is urged by a spring member, is pressed to be fitted in the positioning recess portion so as to provisionally position the movable mold relative to the mounting member, holds the movable mold in spaced relation to the mounting member, and can move out of the positioning recess portion in the arbitrary direction.

3. The mold apparatus according to claim 2, wherein the pressing member comprises a spherical member, and the positioning recess portion is formed into a conical recess-shape.

* * * * *